(12) United States Patent
Parent et al.

(10) Patent No.: US 7,629,418 B2
(45) Date of Patent: Dec. 8, 2009

(54) METHODS FOR THE PREPARATION OF BUTYL GRAFT COPOLYMERS

(75) Inventors: John Scott Parent, Kingston (CA); Sergio A. Guillén-Castellanos, Calgary (CA); Ralph Allen Whitney, Kingston (CA); Rui Resendes, Corunna (CA)

(73) Assignees: LANXESS Inc., Sarnia, Ontario (CA); Queen's University at Kingston, Kingston, Ontario (CA)

( * ) Notice: Subject to any disclaimer, the term of this patent is extended or adjusted under 35 U.S.C. 154(b) by 81 days.

(21) Appl. No.: 11/505,581

(22) Filed: Aug. 17, 2006

(65) Prior Publication Data

US 2007/0049695 A1    Mar. 1, 2007

Related U.S. Application Data

(60) Provisional application No. 60/711,572, filed on Aug. 26, 2005.

(51) Int. Cl.
*C08F 297/02* (2006.01)
(52) U.S. Cl. .............. 525/242; 525/256; 525/259; 525/319
(58) Field of Classification Search ............ 525/50–540
See application file for complete search history.

(56) References Cited

U.S. PATENT DOCUMENTS

| | | | | |
|---|---|---|---|---|
| 2,356,128 | A | | 8/1944 | Thomas et al. ............... 260/79 |
| 3,458,599 | A | | 7/1969 | Daumiller et al. ............ 260/879 |
| 3,904,708 | A | * | 9/1975 | Kennedy et al. ............. 525/249 |
| 3,933,942 | A | | 1/1976 | Kennedy et al. ........ 260/878 R |
| 5,162,445 | A | * | 11/1992 | Powers et al. ............. 525/333.4 |
| 5,264,494 | A | * | 11/1993 | Ho et al. ..................... 525/237 |
| 5,314,958 | A | * | 5/1994 | Himori ....................... 525/256 |
| 6,960,632 | B2 | * | 11/2005 | Kaszas ..................... 525/332.8 |

FOREIGN PATENT DOCUMENTS

| | | |
|---|---|---|
| CA | 2279085 | 1/2001 |
| CA | 2368363 | 7/2003 |
| CA | 2383474 | 10/2003 |
| CA | 2386098 | 11/2003 |
| CA | 2418822 | 8/2004 |
| CA | 2465301 | 10/2005 |
| CA | 2471006 | 12/2005 |
| EP | 0 516 077 | 1/1996 |
| EP | 0 513 620 | 7/1996 |
| EP | 1 329 479 | 8/1996 |
| EP | 1 111 004 | 6/2001 |
| GB | 865297 | 4/1961 |
| GB | 1174323 | 12/1969 |
| WO | 01/09225 | 2/2001 |

OTHER PUBLICATIONS

Ullmanns Encyclopedia of Industrial Chemistry, vol. A 23, 1993, pp. 288-295 "Refractory Ceraminc to Silicon Carbide", Elvers, Hawkins, Russey, Schulz.
Fréchet, J.M. J.; de Smet, M.D.; Farrall, M.J., J. Org. Chem. 1979, vol. 44, No. 11, 1774-1779 "Application of Phase-Transfer Catalysis to the Chemical Modification of Cross-Linked Polystyrene Resins".
Fréchet, J.M. J.; J. Macrolmol. Sci.-Chem. 1981, A15, 877-890; "Chemical Modification of Halogenated Polymers Under Phase Transfer Conditions".
Nishikubo, T.; Iizawa, T.; Kobayashi, K.; Masuda, Y.; Okawara, M. Macromolecules 1983, 16, 722-727; Esterification Reaction of Poly[(chloromethyl)styrene] with Salts of Carboxylic Acids Using Phase-Transfer Catalysts.
Parent, J.S., Thom, D.J., White, G., Whitney, R.A., and Hopkins, W., J. Polym. Sci. Part A: Polym. Chem., 29, 2019-2026, 2001 "Thermal Stability of Brominated Poly(isobutylene-co-isoprene)".

\* cited by examiner

*Primary Examiner*—Irina S Zemel
(74) *Attorney, Agent, or Firm*—Michael A. Miller

(57) ABSTRACT

Preparation of butyl rubber based graft co-polymers from halobutyl elastomers using phase transfer catalysts in the presence of a solution of an alkali metal salt of an oxygen or sulfur nucleophile that is bound to a polymeric substrate. Graft co-polymers can be produced of a butyl polymer (isobutene-co-isoprene) and polymeric substrates such as polyethylene, polypropylene, polystyrene, polybutadiene, polysilanes, polysiloxanes, polyethylene glycol, polyethylene oxide, polyphosphazenes, polyferrocenes or their hybrids.

20 Claims, 1 Drawing Sheet a = exo substitution product
b,c = endo E/Z substitution product

US 7,629,418 B2

METHODS FOR THE PREPARATION OF BUTYL GRAFT COPOLYMERS

This application claims priority to U.S. Provisional application Ser. No. 60/711,572 filed Aug. 26, 2005 in the United States Patent and Trademark Office.

FIELD OF THE INVENTION

The present invention relates to the preparation of modified halogenated butyl elastomers. The present invention also relates to the preparation of grafted halogenated butyl elastomers.

BACKGROUND OF THE INVENTION

Butyl rubber (IIR), a random copolymer of isobutylene and isoprene is well known for its excellent thermal stability, ozone resistance and desirable dampening characteristics. IIR is prepared commercially in a slurry process using methyl chloride as a vehicle and a Friedel-Crafts catalyst as the polymerization initiator. The methyl chloride offers the advantage that $AlCl_3$, a relatively inexpensive Friedel-Crafts catalyst, is soluble in it, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. See U.S. Pat. No. 2,356,128 and *Ullmanns Encyclopedia of Industrial Chemistry*, volume A 23, 1993, pages 288-295. The low polymerization temperatures are required in order to achieve molecular weights which are sufficiently high for rubber applications.

Typically, commercial grades of IIR possess unsaturation levels of approximately 2 mol %. While this degree of unsaturation is commensurate with material stability, it also limits the cure reactivity of these polymers. The post-polymerization halogenation of the isoprene units found in IIR with either elemental chlorine or bromine results in the isolation of either chlorobutyl rubber (CIIR) or bromobutyl rubber (BIIR). These materials possess extremely reactive allylic halide sites which significantly enhance their rate of cure.

Co-pending Canadian Patent Applications CA 2,386,098, CA 2,383,474, CA 2,368,363, CA 2,418,822, CA 2,465,301 and CA 2,471,006 disclose the ability to utilize the allylic halide functionality present in halobutyl rubber with amine- and phosphine-based nucleophilic substitution reactions. The resulting substituted halobutyl rubber possesses enhanced levels of interaction with siliceous fillers and can be successfully incorporated in silica reinforced formulations.

While nucleophilic substitution occurs quite readily with neutral amines and phosphines, the analogous reactions with oxygen or sulfur based nucleophiles are much more arduous. The use of oxygen and sulfur based nucleophiles often requires the presence of a strong base, such as an alkali metal hydroxide, to yield the corresponding anionic nucleophile. Even though the deprotonated oxygen (or sulfur) nucleophile possesses the required level of nucleophilicity, its ionic nature limits its solubility in apolar polymer matrices such as BIIR. Consequently, solvents of intermediate polarity (e.g. THF, dichloromethane) are often used to facilitate such reactions.

Typically, phase transfer catalysis (PTC) involves the introduction of catalytic amounts of a phase transfer catalyst, such as tetra-butylammonium bromide or trioctylmethylammonium chloride, (Aliquate® 336) into a solution containing an alkali metal salt of a nucleophile and the reactive substrate. Exchange of the alkali metal cation for either a tetrabutylammonium or trioctylmethylammonium counter-ion increases the solubility of the nucleophile in the dissolved rubber phase and ultimately increases the efficiency of the nucleophilic substitution reaction. See for example, Dehmlow, E. V.; Dehmlow, S. S. *Monographs in Modern Chemistry No 11: Phase Transfer Catalysis*, 2nd ed.; Verlag Chimie: Germany, 1983. Fréchet, J. M. J.; de Smet, M. D.; Farrall, M. J. *J. Org. Chem.* 1979, 44, 1774-1779; b) Fréchet, J. M. J. *J. Macromol. Sci.-Chem.* 1981, A15, 877-890. Nishikubo, T.; Lizawa, T.; Kobayashi, K.; Masuda, Y.; Okawara, M. *Macromolecules* 1983, 16, 722-727.

SUMMARY OF THE INVENTION

Surprisingly, it has now been discovered that phase transfer catalysis could be employed in the modification of butyl elastomers.

In one aspect, the present invention also provides a process for the modification of halobutyl elastomers including mixing a solution of halobutyl elastomer with a phase transfer catalyst in the presence of a solution of an alkali metal salt of an oxygen or sulfur nucleophile which is bound on a polymeric substrate.

In another aspect, the present invention provides a butyl elastomer graft copolymer prepared by the nucleophilic substitution of the allylic halide sites of the butyl elastomer.

DETAILED DESCRIPTION OF THE INVENTION

Figure 1:
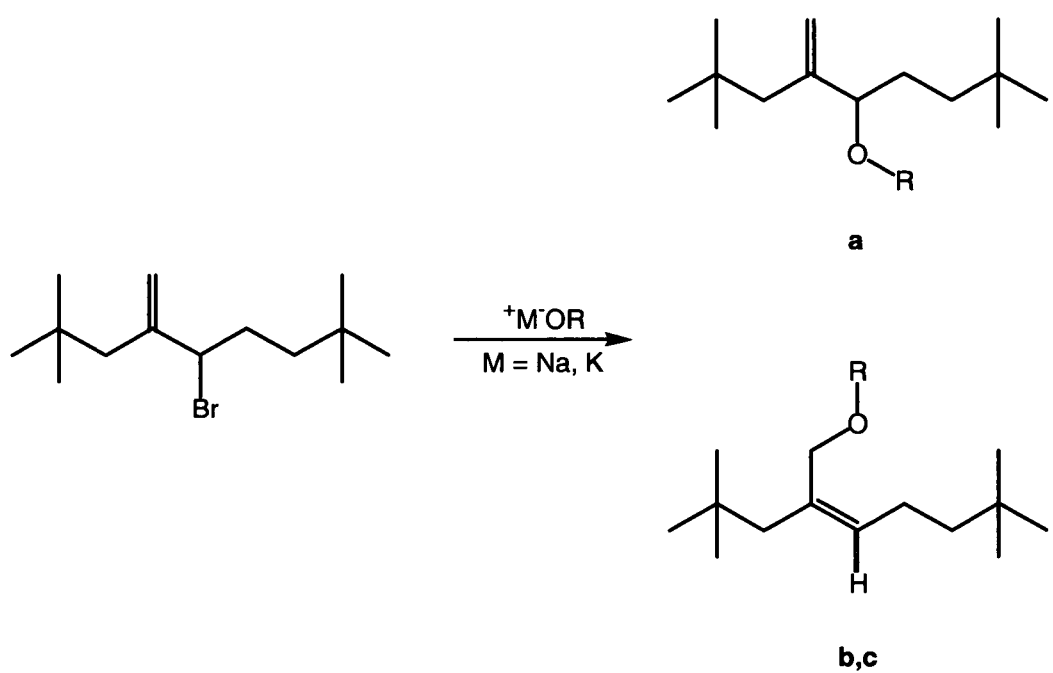
FIG. 1 illustrates the nucleophilic substitution of the allylic halide functionalities present in halobutyl rubber by Na or K salts of an oxygen based nucleophile.

The phrase "halobutyl elastomer(s)" as used herein refers to a chlorinated and/or brominated butyl elastomer. Brominated butyl elastomers are preferred, and the present invention is illustrated, by way of example, with reference to such bromobutyl elastomers. It should be understood, however, that the present invention extends to the use of chlorinated butyl elastomers.

Thus, halobutyl elastomers suitable for use in the practice of the present invention include, but are not limited to, brominated butyl elastomers. Such elastomers may be obtained by bromination of butyl rubber (which is a copolymer having repeating units derived form at least one isoolefin, such as isobutylene and at least one co-monomer that is usually a $C_4$ to $C_6$ conjugated diolefin, preferably isoprene). Co-monomers other than conjugated diolefins can be used, however, and mention is made of alkyl-substituted vinyl aromatic co-monomers such as $C_1$- to $C_4$-alkyl substituted styrene. An example of such an elastomer which is commercially available is brominated isobutylene methylstyrene copolymer (BIMS) in which the co-monomer is p-methylstyrene.

Brominated butyl elastomer typically contains in the range from about 1 to about 3 weight percent of repeating units derived from a diolefin, preferably isoprene and in the range from about 97 to about 99 weight percent of repeating units derived from an isoolefin, preferably isobutylene, (based upon the hydrocarbon content of the polymer) and in the range from about 1 to about 4 weight percent bromine (based upon the bromobutyl polymer). A typical bromobutyl polymer has a molecular weight, expressed as the Mooney viscosity (ML 1+8 at 125° C.), of in the range from about 28 to about 55.

For use in the present invention the brominated butyl elastomer preferably contains in the range from about 1 to about 5 weight percent of repeating units derived from a diolefin, such as isoprene and from about 95 to about 99 weight percent of repeating units derived from an isoolefin, such isobutylene (based upon the hydrocarbon content of the polymer) and from about 0.5 to about 10 weight percent, preferably from about 0.75 to about 2.3 weight percent, of bromine (based upon the brominated butyl polymer).

A stabilizer may be added to the brominated butyl elastomer. Suitable stabilizers include calcium stearate and epoxidized soybean oil, preferably used in an amount in the range from about 0.5 to about 5 parts by weight per 100 parts by weight of the brominated butyl rubber. Examples of suitable brominated butyl elastomers include LANXESS® Bromobutyl 2030™, LANXESS® Bromobutyl 2040™ (BB2040), and LANXESSE® Bromobutyl X2™ commercially available from LANXESS Inc. (Sarnia, Ontario, Canada). LANXESS® BB2040 has a Mooney viscosity (RPML 1+8 @ 125° C. according to ASTM D 52-89) of 39±4, a bromine content of 2.0±0.3 wt. % and an approximate molecular weight Mw of 500,000 grams per mole.

The brominated butyl elastomer used in the process of this invention may also be a graft copolymer of a brominated butyl rubber and a polymer based upon a conjugated diolefin monomer. Co-pending Canadian Patent Application 2,279,085, published on Jan. 29, 2001 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The bromobutyl elastomer of the graft copolymer can be any of those described above. The conjugated diolefins that can be incorporated in the graft copolymer generally have the structural formula:

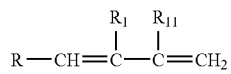

wherein R is a hydrogen atom or an alkyl group containing in the range from 1 to 8 carbon atoms and wherein $R_1$ and $R_{11}$ can be the same or different and are selected from the group consisting of hydrogen atoms and alkyl groups containing in the range from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing in the range from 4 to 8 carbon atoms are preferred, 1,3-butadiene and isoprene being preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, are selected so as to be copolymerizable with the conjugated diolefin monomers being employed. Generally, any vinyl aromatic monomer, which is known to polymerize with organo-alkali metal initiators, can be used. Such vinyl aromatic monomers usually contain in the range from 8 to 20 carbon atoms, preferably in the range from 8 to 14 carbon atoms. Some examples of vinyl aromatic monomers which can be so copolymerized include styrene, alpha-methyl styrene, various alkyl styrenes including p-methylstyrene, p-methoxy styrene, 1-vinyl-naphthalene, 2-vinyl naphthalene, 4-vinyl toluene and the like. Styrene is preferred for copolymerization with 1,3-butadiene alone or for terpolymerization with both 1,3-butadiene and isoprene. It is apparent to one skilled in the art that the given ranges for isoolefin and diolefin will have to be adjusted to result in a total of 100%.

According to the present invention, a solution of a halobutyl elastomer is provided with a phase transfer catalyst and incorporated with a solution of an alkali metal salt of an oxygen or sulfur nucleophile that is bound to a polymeric substrate. Suitable alkali metal salts include Na or K salts of, for example, hydroxyl, carboxylic acid or thiol functionalities which are bound to polymeric substrates.

Suitable polymeric substrates include linear or branched, organic, inorganic or organometallic polymeric species and their hybrids. Functionalization of these polymeric substrates with a hydroxyl or carboxylic acid or a thiol functionality can be achieved by employing common organic and inorganic synthetic methodologies. Examples of polymeric species include, but are not limited to, polyethylene, polypropylene, polystyrene, polybutadiene, polysilanes, polysiloxanes, polyethylene glycol, polyethylene oxide, polyphosphazenes, polyferrocenes or their hybrids.

Suitable phase transfer catalysts include tetra-butylammonium bromide or trioctylmethylammonium chloride, (Aliquate® 336).

The resulting solution is mixed for about 0.1 to 12 h, more preferably for about 0.5 to 8 h and even more preferably for about 2 to 4 h. Mixing is carried out at a temperature in the range of about 0° C. to about 150° C., preferably from about 25° C. to 125° C. and even more preferably from about 50° C. to 100° C. Mixing is carried out a pressure ranging from about 0.1 to 5 atm, more preferably from 0.5 to 3 atm, and even more preferably from about 1 to 2 atm. The mixing is suitably carried out in a continuous or batch mixer and the order of addition of the components to the mixer is not critical.

The alkali metal salt of the polymer bound oxygen or sulphur nucleophile can be randomly distributed throughout each polymer chain. Preferably, the alkali metal salt of the polymer bound oxygen or sulphur nucleophile is located at the chain ends of the polymeric substrate. Even more preferably the alkali metal salt of the polymer bound oxygen or sulphur nucleophile is located at one chain end. The amount of alkali metal salt of the polymer bound oxygen or sulphur nucleophile is present in amounts ranging from 0.1 to 10 molar equivalents, more preferably in amounts ranging from 0.5 to 5 molar equivalents and even more preferably in amounts ranging from about 1 to 3 molar equivalents based on the total molar quantities of allylic halide (as bound to the halobutyl elastomer) present in the system.

The present invention is further illustrated in the following examples.

EXAMPLES

Materials

Brominated 2,2,4,8,8-pentamethyl-4-nonene (BPMN) was prepared as described previously (see Parent, J. S., Thom, D. J., White, G., Whitney, R. A., and Hopkins, W., *J. Polym. Sci. Part A: Polym. Chem.*, 29, 2019-2026, 2001). The following reagents were used as received from Sigma-Aldrich (Oakville, Ontario): polycaprolactone (Mn~10,000), monoalcohol-terminated polyethylene (Mn=700), maleic anhydride (99%), tetrabutylammonium bromide (98%), and potassium hydroxide (99%). Polyethylene oxide monoethyl ether (Mn=5000) was obtained from Alfa Aesar. BIIR (BB2030) was used as supplied by LANXESS Inc. (Sarnia, Ontario). Monocarboxy-terminated polybutadiene (cis, Mw~8000) was prepared according to the following procedure. To a 1 L glass bottle, 170 gms of dried and degassed hexanes was added under a Nitrogen environment. To this, 30 gms of 1,3-butadiene was pressurized into the bottle. The polymerization was initiated via the addition of 4.3 mL of a 1.4 M solution of sec-BuLi in hexanes and 10 mL of tetramethylethylenediamine (TMEDA). The polymerization was allowed to proceed at 30° C. for 5.5 h at which point the bottle was pressurized to 20 psi with anhydrous $CO_2$ gas. After an additional 20 minutes, 20 mL of methanolic HCl (10 wt. % HCl in MeOH) was added to the polymerization bottle. This solution was agitated for 10 minutes, at which point the polymer solution was washed with 3×500 mL aliquots of de-ionized water. The organic layer was dried with the use of $NaHCO_3$. The carboxylic acid terminated BR was isolated by evaporation. Yield (14.63 g, 48.8%). FT-IR analysis: 1639 $cm^{-1}$ (C=O).

Equipment

NMR spectra were recorded in $CDCl_3$ or $d_8$-toluene on a Bruker AM400 instrument with chemical shifts ($\delta$) reported relative to tetramethylsilane in ppm. Fourier-transform infrared spectra were acquired as solvent-cast films using a Nicolet Avatar ESP 360 instrument at a resolution of 4 $cm^{-1}$. Differential scanning calorimetry (DSC) was used to study the thermal transitions of the graft copolymers. Aluminum crucibles containing the samples (5-10 mg) were subjected to heating-cooling cycles (at 10° C./min) in a DSCQ100 (TA Instruments) or a DSC 220U (Seiko Instruments) equipped with liquid nitrogen cooling system. Heat flow as a function of time was recorded and the resulting thermograms analyzed with the TA Universal Analysis software. Gel Permeation Chromatography (GPC) analyses were conducted in a Waters 2960 separation module equipped with Styragel HR5, HR4, HR3, HR1, and HR0.5 columns and distilled toluene as the carrier solvent or in a Waters Associates GPC system equipped with a 515 HPLC pump, a 410 Differential Refractometer, a Waters 464 Differential Absorbance Detector and 6 Styragel columns using THF at a flow rate of 0.5 mL/min at 35° C.

Example 1, BPMN—BR Coupling. Carboxylated-polybutadiene (1.5 g, ~0.18 mmol), KOH (0.02 g, 0.35 mmol) and n-$Bu_4NBr$ (0.1 g, 0.31 mmol) were combined in xylene (5 ml). The mixture was stirred for 1-2 minutes at room temperature prior to the addition of BPMN (50 mg, 0.18 mmol). The flask was sealed, back-filled with nitrogen and heated to 100° C. for 1.5 hours. The product of the reaction was filtered and volatile components were removed by Kugelrhor distillation (P=0.6 mmHg, T=60° C., t=30 min) to yield a yellow residue.). FT-IR analysis: 1736 $cm^{-1}$ (C=O). $^1$H NMR ($CDCl_3$) analysis; Found for endo isomer 1: $^1$H NMR ($CDCl_3$): $\delta$ 4.59 (s, —$CH_2OC(O)$—). Found for endo isomer 2: $^1$H NMR ($CDCl_3$): $\delta$ 4.51 (s, —$CH_2OC(O)$—).

Example 2, BPMN—PCL Coupling. Polycaprolactone (1 g, ~0.025 mmol), KOH (4 mg, 0.07 mmol) and n-$Bu_4NBr$ (8 mg, 0.025 mmol) were combined in toluene (5 ml). The mixture was stirred for 2 minutes at room temperature prior to the addition of BPMN (100 mg, 0.36 mmol), after which it was heated to 85° C. for 3 hours. The product of the reaction was filtered and volatile components were removed by Kugelrhor distillation (P=0.6 mmHg, T=100° C., t=45 min) to yield a yellow residue.). $^1$H NMR ($CDCl_3$) analysis: Found for endo isomer 1: $\delta$ 4.44 (s, —$CH_2OC(O)$—), 5.47 (t, H—C=). Found for endo isomer 2: $\delta$ 4.52 (s, —$CH_2OC(O)$—), 5.34 (t, H—C=).

Example 3, BIIR—BR Coupling. All reagent manipulations and reactions were conducted under a nitrogen atmosphere. Purified BIIR (6 g) was dissolved in toluene (100 ml) at room temperature. Monocarboxylated-polybutadiene (10 g) was dissolved in toluene (25 ml), treated with KOH (0.07 g, 1.25 mmol) and tetrabutylammonium bromide (0.38 g, 1.18 mmol), and added to the BIIR solution. The mixture was stirred in the dark for 4 hr at 95° C. To study the progress of the reaction, aliquots (2 ml) were collected at different time intervals via syringe. The polymer was isolated by precipitation with acetone (10 ml) and dried in vacuo. BHT (0.01 g) was added during the purification to prevent oxidative degradation of the BR grafts. The integration of $^1$H NMR spectra of unpurified samples provided the relative concentrations of the following products: $\delta$=4.32 ppm (analogous to exo-BPMN, 1H, t), $\delta$=4.10-4.00 ppm (analogous to endo-BPMN, 2H, s), $\delta$=4.65-4.43 ppm (analogous to endo isomers BPMN-BR, 2H, s).

Example 4, BIIR—PCL Coupling. Toluene solutions of BIIR (5.2 g in 120 ml) and polycaprolactone (10 g in 25 ml) were combined at room temperature prior to the addition of KOH (0.06 g, 1 mmol) and tetrabutylammonium bromide (0.33 g, 1 mmol). The mixture was stirred for 6 hr at 95° C. Aliquots (3 ml) were collected at different time intervals via syringe. To isolate the polymer, the solvent was removed by rotary evaporation and the residue was washed with acetone (2×, 15 ml) at room temperature. The presence of only unreacted PCL in the acetone-soluble phase was confirmed by $^1$H NMR spectroscopy. The integration of $^1$H NMR spectra provided the relative concentrations of the following products: $\delta$=5.02 ppm (analogous to exo-BPMN, 1H, s), $\delta$=4.10-4.00 ppm (analogous to endo-BPMN, 2H, s), $\delta$=4.60-4.44 ppm (analogous to endo isomers PCL-BPMN, 2H, s), and $\delta$=5.96-5.90 ppm (analogous to 2, 2H, d).

Example 5, BIIR-Monohexyl Maleate. To a toluene solution of purified BIIR (0.5 g in 10 ml), excess monohexyl maleate (0.04 g, 0.2 mmol; Appendix B1) was added. The mixture was then treated with KOH (0.01 g, 0.2 mmol) and tetrabutylammonium bromide (0.06 g, 0.2 mmol), heated to 100° C. and stirred for 60 minutes. The product of the reaction was isolated and purified by successive precipitation from toluene into acetone (2×) and dried in vacuo. FT-IR analysis: 1732 $cm^{-1}$ (C=O). $^1$H NMR ($CDCl_3$) analysis: $\delta$ 4.68 (s, —$CH_2OC(O)$—, isomer 1), 5.39 (t, H—C=, isomer 1), 4.60 (s, —$CH_2OC(O)$—, isomer 2), 5.53 (t, H—C=, isomer 2), 4.15 (t, —(O)CO—$CH_2$—R, both isomers), 6.20 (s, —CH=CH—, both isomers); $^1$H NMR (d-toluene) analysis: $\delta$ 4.92 (s, —$CH_2OC(O)$—, isomer 1), 5.55 (t, H—C=, isomer 1), 4.86 (s, —$CH_2OC(O)$—, isomer 2), 5.69 (t, H—C=, isomer 2), 4.12 (t, —(O)CO—$CH_2$—R, both isomers), 6.84 (m, —CH=CH—, both isomers);

Example 6, BIIR—PCL Coupling (Maleic Anhydride Approach). Toluene solutions of BIIR (0.5 g in 10 ml) and MAn-polycaprolactone (0.5 g in 10 ml) were combined at room temperature prior to the addition of KOH (0.01 g, 0.18 mmol) and tetrabutylammonium bromide (0.03 g, 0.1 mmol). The mixture was stirred for 2 hr at 80° C. Aliquots (0.5 ml) were collected at different time intervals. To isolate the polymer, the solvent was evaporated and the residue was washed with acetone (2×, 15 ml) at room temperature. The presence of only unreacted MAn-polycaprolactone in the acetone-soluble phase was confirmed by $^1$H NMR spectroscopy. The integration of $^1$H NMR ($CDCl_3$) spectra provided the relative concentrations of the following products: $\delta$=5.02 ppm (analogous to exo-BPMN, 1H, s), δ=4.10-4.00 ppm (analogous to endo-BPMN, 2H, s), δ=4.68 ppm (analogous to endo isomer 1 of BIIR-monohexyl maleate, 2H, s), δ=6.84 (analogous to olefinic protons of BIIR-monohexyl maleate, 2H, s), and δ=5.96-5.90 ppm (analogous to 2, 2H, d).

Example 7, Maleic Acid Terminated PE. Xylene mixtures of MAn and hydroxy-terminated PE (or PEO) were stirred vigorously at 115-120° C. for at least 4 hours after which, the solvent was evaporated and the polymer purified by Kugelrhor distillation (P=0.6 mmHg, T=80° C., t=60 min). The formation of 20-60% terminal maleic acid functionality was confirmed by FTIR and $^1$H NMR.

Example 8, BIIR-PE Coupling (Maleic Anhydride Approach). BIIR (0.5 g, 0.1 mmol of allylic bromide sites) was dissolved in toluene (10 ml) at room temperature. To this solution, monomaleic acid terminated polyethylene (0.08 g, 1 eq. relative to allylic bromide sites), KOH (0.005 g, 0.09 mmol) and tetrabutylammonium bromide (0.03 g, 0.09 mmol) were added. The mixture was stirred overnight at 90° C. Aliquots of the polymer-containing mixture were precipitated in acetone (10 ml) and dried in vacuo prior to spectroscopic and thermal characterization. FTIR analysis: 1732 cm$^{-1}$ (C=O, ester); The integration of $^1$H NMR (d-toluene) spectra of unpurified samples provided the relative concentrations of the following products: δ=5.07 ppm (analogous to exo-BPMN, 1H, s), δ=4.08-4.00 ppm (analogous to endo-BPMN, 2H, s), δ=4.93 ppm (analogous to endo isomer 1 of BIIR-monohexyl maleate, 2H, s), and δ=5.93-5.80 (analogous to olefinic protons of BIIR-monohexyl maleate, 2H, m).

Example 9, Maleic Acid Terminated PEO. Toluene mixtures of MAn and PEO were stirred vigorously at 80° C. for at least 4 hours after which, the solvent was evaporated and the polymer purified by Kugelrhor distillation (P=0.6 mmHg, T=80° C., t=60 min). The formation of 20-60% terminal maleic acid functionality was confirmed by FTIR and $^1$H NMR.

Example 10, BIIR-PEO Coupling (Maleic Anhydride Approach). Monomaleic acid terminated PEO (0.2 g) was dissolved in toluene (10 ml), treated with KOH (0.003 g, 0.05 mmol) and tetrabutylammonium bromide (0.012 g, 0.04 mmol), and added to a toluene solution of BIIR (0.5 g in 10 ml). The mixture was stirred for 2 hr at 90° C. after which, the solvent was evaporated. Unreacted PEO was extracted with acetone and the copolymer was dried in vacuo prior to characterization. The presence of only PEO in the acetone-soluble phase was confirmed by $^1$H NMR spectroscopy. FTIR analysis: 1732 cm$^{-1}$ (C=O, ester), 1110 cm$^{-1}$ (C—O—C); The integration of $^1$H NMR (CDCl$_3$) spectra provided the relative concentrations of the following products: δ=5.02 ppm (analogous to exo-BPMN, 1H, s), δ=4.10-4.00 ppm (analogous to endo-BPMN, 2H, s), δ=4.68 ppm (analogous to endo isomer 1 of BIIR-monohexyl maleate, 2H, s), δ=6.84 (analogous to olefinic protons of BIIR-monohexyl maleate, 2H, s), and δ=5.96-5.90 ppm (analogous to 2, 2H, d).

The examples provided herein illustrate the preparation of a variety of butyl rubber based graft copolymers via the treatment of a solution of the halobutyl rubber with a phase transfer catalyst in the presence of a solution an alkali metal salt of an oxygen or sulfur nucleophile which is bound on a polymeric substrate under the conditions described above.

Although the invention has been described in detail in the foregoing, it is to be understood that such detail is solely for the purpose of illustration and that variations can be made therein by those skilled in the art without departing from the spirit and scope of the invention except as it may be limited by the claims.

The invention claimed is:

1. A process for the preparation of a butyl graft co-polymer comprising:
    a) providing a first solution comprising a phase transfer catalyst and a halogenated butyl polymer comprising repeating units derived from at least one $C_4$ to $C_7$ isoolefin monomer and at least one $C_4$ to $C_{14}$ multiolefin monomer, the halogenated butyl polymer having allylic halide sites;
    b) providing a second solution comprising an alkali metal salt of an oxygen or sulfur nucleophile that is bound to a polymeric substrate;
    c) mixing the first and second solutions; and,
    d) grafting the polymeric substrate to the halogenated butyl polymer by nucleophilic substitution of the allylic halide sites.

2. The process according to claim 1, wherein the isoolefin comprises isobutylene and the multiolefin comprises isoprene.

3. The process according to claim 1, wherein the isoolefin comprises isobutylene and the multiolefin comprises p-methylstyrene.

4. The process according to claim 1, wherein the halogenated butyl polymer comprises a brominated or chlorinated butyl polymer.

5. The process according to claim 1, wherein the phase transfer catalyst comprises tetra-butylammonium bromide or trioctylmethylammonium chloride.

6. The process according to claim 1, wherein the alkali metal salt comprises a Na or K salt of a hydroxyl, a carboxylic acid or a thiol moiety.

7. The process according to claim 1, wherein the polymeric substrate comprises a linear or branched organic, inorganic or organometallic polymeric species.

8. The process according to claim 1, wherein the polymeric substrate comprises polyethylene, polypropylene, polystyrene, polybutadiene, polysilanes, polysiloxanes, polyethylene glycol, polyethylene oxide, polyphosphazenes, polyferrocenes or their hybrids.

9. The process according to claim 1, wherein the halogenated butyl polymer comprises a graft co-polymer of a brominated butyl rubber and a conjugated diolefin monomer.

10. The process according to claim 1, wherein the halogenated butyl polymer comprises a graft co-polymer of a brominated butyl rubber and a vinyl aromatic monomer.

11. A butyl grafted copolymer prepared by
    a) providing a first solution comprising a phase transfer catalyst and a halogenated butyl polymer comprising repeating units derived from at least one $C_4$ to $C_7$ isoolefin monomer and at least one $C_4$ to $C_{14}$ multiolefin monomer, the halogenated butyl polymer having allylic halide sites
    b) providing a second solution comprising an alkali metal salt of an oxygen or sulfur nucleophile that is bound to a polymeric substrate;
    c) mixing the first and second solutions; and,
    d) grafting the polymeric substrate to the halogenated butyl polymer by nucleophilic substitution of the allylic halide sites.

12. The grafted copolymer according to claim 11, wherein the isoolefin comprises isobutylene and the multiolefin comprises isoprene.

13. The grafted copolymer according to claim 11, wherein the isoolefin comprises isobutylene and the multiolefin comprises p-methylstyrene.

14. The grafted copolymer according to claim 11, wherein the halogenated butyl polymer comprises a brominated or chlorinated butyl polymer.

15. The grafted copolymer according to claim 11, wherein the phase transfer catalyst comprises tetra-butylammonium bromide or trioctylmethylammonium chloride.

16. The grafted copolymer according to claim 11, wherein the alkali metal salt comprises a Na or K salt of a hydroxyl, a carboxylic acid or a thiol moiety.

17. The grafted copolymer according to claim 11, wherein the polymeric substrate comprises a linear or branched organic, inorganic or organometallic polymeric species.

18. The grafted copolymer according to claim 11, wherein the polymeric substrate comprises polyethylene, polypropylene, polystyrene, polybutadiene, polysilanes, polysiloxanes, polyethylene glycol, polyethylene oxide, polyphosphazenes, polyferrocenes or their hybrids.

19. The grafted copolymer according to claim 11, wherein the halogenated butyl polymer comprises a graft co-polymer of a brominated butyl rubber and a conjugated diolefin monomer.

20. The grafted copolymer according to claim 11, wherein the halogenated butyl polymer comprises a graft co-polymer of a brominated butyl rubber and a vinyl aromatic monomer.

* * * * *